(12) United States Patent
Ina (10) Patent No.: US 9,849,930 B2
(45) Date of Patent: Dec. 26, 2017

(54) BATTERY STORAGE PART STRUCTURE

(71) Applicant: SUZUKI MOTOR CORPORATION, Hamamatsu-shi, Shizuoka (JP)

(72) Inventor: Jun Ina, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/347,300

(22) Filed: Nov. 9, 2016

(65) Prior Publication Data

US 2017/0183054 A1  Jun. 29, 2017

(30) Foreign Application Priority Data

Dec. 24, 2015  (JP) .................................. 2015-252614

(51) Int. Cl.
| | |
|---|---|
| *B62K 19/30* | (2006.01) |
| *B60R 16/04* | (2006.01) |
| *H01M 2/10* | (2006.01) |
| *B62J 17/00* | (2006.01) |
| *B62K 11/04* | (2006.01) |

(52) U.S. Cl.
CPC ........... *B62K 19/30* (2013.01); *H01M 2/1083* (2013.01); *B62J 17/00* (2013.01); *B62K 11/04* (2013.01); *H01M 2220/20* (2013.01)

(58) Field of Classification Search
CPC .... B62K 19/30; B62K 11/04; B62J 2099/004; B60R 16/04; H01M 2/1083; H01M 2220/20
See application file for complete search history.

(56) References Cited

U.S. PATENT DOCUMENTS

| | | | | | |
|---|---|---|---|---|---|
| 2,607,433 | A | * | 8/1952 | Simi ....................... | B60R 16/04 180/68.5 |
| 2,985,351 | A | * | 5/1961 | Du Shane ............... | B60R 11/06 180/68.5 |
| 3,821,997 | A | * | 7/1974 | Sieren ................. | H01M 2/1083 180/68.5 |
| 2004/0144580 | A1 | * | 7/2004 | Wu ....................... | H01M 10/48 180/68.5 |

(Continued)

FOREIGN PATENT DOCUMENTS

JP  2013-95232 A  5/2013

*Primary Examiner* — Frank B Vanaman
(74) *Attorney, Agent, or Firm* — Stein IP, LLC (57) ABSTRACT

A battery storage part structure 41 configured to store a battery 21 is provided inside a front cowl of a saddle-riding type vehicle. The battery storage part structure 41 includes: a first loading part configured to load the battery 21 at a holding position P in a first posture with a terminal arrangement surface 22 directed in a direction of an upper wall part 44; and a second loading part configured to load the battery 21 at the holding position P in a second posture with the terminal arrangement surface 22 directed in a direction of an opening 48. The first loading part is configured by a surface 43A of a bottom plate part 43, etc. of a battery storage part 42, and the second loading part is configured by a groove 51 formed on the bottom plate part 43 and a protruding part 53 formed on the upper wall part 44. By setting the battery 21 in the second posture, it is possible to secure a tool line to the battery 21 via the opening 48.

4 Claims, 5 Drawing Sheets (56) References Cited

U.S. PATENT DOCUMENTS

| | | | |
|---|---|---|---|
| 2004/0226765 A1* | 11/2004 | Mathews | B60K 1/04 180/68.5 |
| 2008/0078596 A1* | 4/2008 | Kim | B60R 16/04 180/68.5 |
| 2012/0018237 A1* | 1/2012 | Kovach | H01M 2/1083 180/68.5 |

* cited by examiner

BATTERY STORAGE PART STRUCTURE

CROSS REFERENCE TO RELATED APPLICATIONS

This application claims priority of Japanese Application No. 2015-252614 filed on Dec. 24, 2015. The contents of this application are incorporated herein by reference in their entirety.

BACKGROUND OF THE INVENTION

1. Field of the Invention

The present invention relates to a battery storage part structure configured to store a battery.

2. Description of the Related Art

In a saddle-riding type vehicle such as a motorcycle, a battery is mounted as a supply source of power required for operations of the vehicles, for example, the drive of a starter motor. In a naked-type or sport-type motorcycle, a battery is generally stored within a storage space formed under a seat. Further, in a scooter-type motorcycle, in many cases, a battery is stored under a floor step between a handle and a seat or under the seat. For example, Japanese Application Publication No. 2013-95232 (hereinafter, referred to as "Patent Document 1") describes a structure configured to store a battery within a storage space formed under a seat.

SUMMARY OF THE INVENTION

1. Problems to be Solved by the Invention

As described above, a storage place of a battery varies depending of the types of saddle-riding type vehicles, and some of the saddle-riding type vehicles store a battery in a deep part inside of a car body. When a battery is stored in a portion far into the inside of a car body, performing maintenance work of the battery sometimes becomes difficult.

For example, a power source cable is connected between a battery and a car body, and a terminal of the power source cable is fixed to a terminal of the battery by a bolt. When performing the maintenance of the battery, it is needed to remove the bolt fixing the terminal by using a tool such as a screwdriver to disconnect between the power source cable and the battery. So, when a battery is stored in a portion deep into the inside of a car body, it is difficult to secure a working space due to the small space around the battery, and thus, when inserting a long tool into a bolt and connecting the tool with the bolt to loosen or tighten the bolt, it is difficult to secure a path (tool line) enabling the tool to connect with the bolt and a mounting posture of the battery, and consequently, it becomes difficult to perform the maintenance work.

Regarding this point, the above-described Patent Document 1 describes a motorcycle with a structure configured to form, under a seat and at an upper part of a rear fender, an article storage part having an opening at an upper part thereof and store a battery within the article storage part. The article storage part has a structure configured to store a battery in its deep part, but a temporarily storing part of the battery capable of hooking a corner of the battery is formed at a portion near the opening in the article storage part. Upon maintenance, after pulling out the battery from the deep part of the article storage part, it is possible to support the battery by hooking on the temporarily storing part of the battery. The Patent Document 1 describes that it is possible to easily perform work of detaching the power source cable from the battery, with the battery supported on the temporarily storing part of the battery.

Certainly, according to the battery storage part structure described in Patent Document 1, it is believed that, upon maintenance, it is possible to easily secure a tool line to the battery by moving the battery from the deep part of the article storage part to the temporarily storing part of the battery. However, with the battery storage part structure described in Patent Document 1, the power source cable is detached from the battery after moving the battery from the deep part of the article storage part to the temporarily storing part of the battery; therefore, in order to enable this operation, it is needed to provide a power source cable having a length corresponding to the moving distance of the battery. For this reason, the power source cable becomes longer and heavier. Moreover, as a result, when putting the battery into the deep part of the article storage part, it becomes difficult to store the battery due to the rigid and long power source cable as an obstacle, and thus, a problem occurs that the workability of maintenance becomes worse. Further, when the battery is arranged at the deep part of the article storage part, a problem occurs that space for folding and housing the long power source cable needs to be secured.

The present invention has been achieved in view of the above-described problems, for example, and therefore, an object of the present invention is to provide a battery storage part structure capable of improving the workability of maintenance of a battery.

2. Solution to Problem

To solve the problem, the aspect of the present invention is summarized as a battery storage part structure of a saddle-riding type vehicle configured to store a battery of which one face is a terminal arrangement surface arranged with a battery terminal connecting a power source cable and the opposite face of the terminal arrangement surface is an installation surface, including: a battery storage part configured to hold the battery at a predetermined holding position inside the battery storage part, the battery storage part being formed in a bottomed cylindrical shape having a bottom plate part, a peripheral wall part, and an opening arranged at an opposite side of the bottom plate part; a first loading part configured to load the battery at the holding position in a first posture with the terminal arrangement surface directed in a direction of the peripheral wall part, the first loading part being provided in the battery storage part; and a second loading part configured to load the battery at the holding position in a second posture with the terminal arrangement surface directed in a direction of the opening, the second loading part being provided in the battery storage part.

According to the aspect of the invention, within the battery storage part, the battery is loaded in a first posture during normal use, and the battery is loaded in a second posture during maintenance. When the battery is loaded in the first posture, a terminal arrangement surface of the battery is directed in a direction of a peripheral wall part of the battery storage part, and thus, it is sometimes difficult to secure a tool line to the battery; however, when the battery is loaded in the second posture, the terminal arrangement surface of the battery is directed in a direction of an opening of the battery storage part, and thus, it becomes easier to secure the tool line to the battery. Therefore, it is possible to improve the workability of maintenance of the battery.

Further, the battery may take two patterns of postures (the first posture and the second posture), but in either posture, the battery stops at a holding position and does not move from the holding position to another place along with a change in posture. That is, by changing an inclination angle at the same place, the battery changes its posture from the first posture to the second posture or from the second posture to the first posture. As described above, it is possible to produce a state capable of easily securing the tool line to the battery by changing its inclination angle with the battery stopped at the holding position, and thus, unlike the conventional technology, there is no need to move the battery from the deep part of the storage part to a proximity of the opening (temporarily storing part) in order to produce a state capable of easily securing the tool line to the battery. Therefore, there is no need to longer the power source cable by taking into consideration the moving distance of the battery. As a result, it is possible to shorten the power source cable. Consequently, when the battery is put into the battery storage part, it is possible to prevent the power source cable from being an obstacle and then make it easier to put the battery into the battery storage part, and thus, it is possible to improve the workability of maintenance.

In the above-described battery storage part structure of the present invention, it is preferable that the first loading part includes a surface of the bottom plate part with which the installation surface of the battery in the first posture is in contact, and the second loading part includes a groove provided to the bottom plate part and into which a portion of one end side of the installation surface of the battery in the second posture enters.

According to the aspect of the invention, when the battery is in the first posture, the battery is loaded on the bottom plate part in a state that the installation surface thereof is in contact with the surface of the bottom plate part of the battery storage part. On the other hand, when the battery is in the second posture, the battery is loaded on the bottom plate part in a state that the portion of one end side of the installation surface of the battery enters into the groove provided to the bottom plate part. The inclination angles of the battery are different between the state that the installation surface of the battery is in contact with the surface of the bottom plate part of the battery storage part and the state that the portion of one end side of the installation surface of the battery enters into the groove. However, in either state, the battery is placed on the bottom plate part of the battery storage part, and stops at the same place, i.e., the holding position. As described above, according to the aspect of the invention, it is possible to actualize a function by which a battery is loaded in two patterns of postures, with a simple structure such as providing a groove to a part of a bottom plate part of a battery storage part.

In the above-described battery storage part structure of the present invention, it is preferable that the second loading part includes a protruding part that protrudes into the battery storage part from the peripheral wall part, the protruding part having a protruding end being in contact with a portion of the other end side of the installation surface of the battery in the second posture.

According to the aspect of the invention, when the battery is in the second posture, the portion of one end side of the installation surface of the battery enters into the groove, and the portion of the other end side of the installation surface of the battery is in contact with the protruding part. As described above, both the portion of one end side and the portion of the other end side of the installation surface of the battery in the second posture are supported, and thus, it is possible to hold the battery in the second posture in a stable state. Therefore, for the battery in the second posture, it is possible to easily perform work such as attachment and detachment of the power source cable.

In the above-described battery storage part structure of the present invention, it is preferable that at a back side of the protruding part, a recess corresponding to a shape of the protruding part protruding into the battery storage part is formed, and an engine control unit of the saddle-riding type vehicle is arranged with the recess.

According to the aspect of the invention, it is possible to easily secure, near the battery, an arrangement space of the engine control unit.

In the above-described battery storage part structure of the present invention, it is preferable that the battery storage part is provided inside a front cowl of the saddle-riding type vehicle.

According to the aspect of the invention, as in a case of a scooter, for example, even when it is difficult to secure space for storing the battery under the seat as a result of using the space under the seat for storing a helmet, it is possible to easily secure the space for storing the battery by providing the battery storage part inside the front cowl. In addition, even when space to be formed inside the front cowl is smaller as compared with the space under the seat, with the above-described structure by which the battery is loaded in two patterns of postures, it is possible to easily secure the tool line to the battery, and thus, it is possible to prevent a decrease in the workability of maintenance of the battery.

In the above-described battery storage part structure of the present invention, it is preferable that for the battery storage part, the opening is located in front of the seat of the saddle-riding type vehicle; the bottom plate part is located at a front side of the saddle-riding type vehicle relative to the opening; the peripheral wall part is arranged so as to elongate in a front-rear direction of the saddle-riding type vehicle; when the battery is loaded on the first loading part, the terminal arrangement surface is directed to an upper side or a rear upper side of the saddle-riding type vehicle as well as an inclination angle relative to a horizontal plane of the terminal arrangement surface is 0 degree or more and 45 degrees or less; and when the battery is loaded on the second loading part, the terminal arrangement surface is directed to the rear upper side or a rear side of the saddle-riding type vehicle as well as the inclination angle relative to the horizontal plane of the terminal arrangement surface is 45 degrees or more and 90 degrees or less.

According to the aspect of the invention, the battery storage part is arranged so as to elongate inside the front cowl in the front-rear direction and such that space inside thereof forms a horizontal hole opening backward. Then, during normal use, the battery is held at the holding position within the battery storage part in a posture that the terminal arrangement surface is directed to the upper side or the rear upper side as well as the inclination angle relative to the horizontal plane of the terminal arrangement surface is 0 degree or more and 45 degrees or less. At this time, there is the peripheral wall part of the battery storage part ahead in a direction that the terminal arrangement surface is directed. On the other hand, during maintenance, the battery is held within the battery storage part in a posture that the terminal arrangement surface is directed to the rear upper side or the rear side as well as the inclination angle relative to the horizontal plane of the terminal arrangement surface is 45 degrees or more and 90 degrees or less. At this time, there is the opening of the battery storage part ahead in a direction that the terminal arrangement surface is directed. Therefore, during normal use, it is possible to hold the battery in a stable state (horizontal or substantially horizontal), and on the other hand, during maintenance, the battery is set to a vertical or substantially vertical state, and thus, it is possible to easily secure the tool line to the battery via the opening.

Advantageous Effects of Invention

According to the present invention, it is possible to improve the workability of maintenance of the battery.

BRIEF DESCRIPTION OF THE DRAWINGS

FIGS. 2(1) and 2(2) are explanatory diagrams of a front upper side of the saddle-riding type vehicle in FIG. 1 viewed from behind with lid parts of front boxes closed and with one of the lid parts closed, respectively.

FIGS. 5(1) and 5(2) are explanatory diagrams showing states that the battery is supported in a first posture and a second posture, respectively, in the battery storage part structure according to the embodiment of the present invention.

DESCRIPTION OF THE EMBODIMENT

Figure 1:
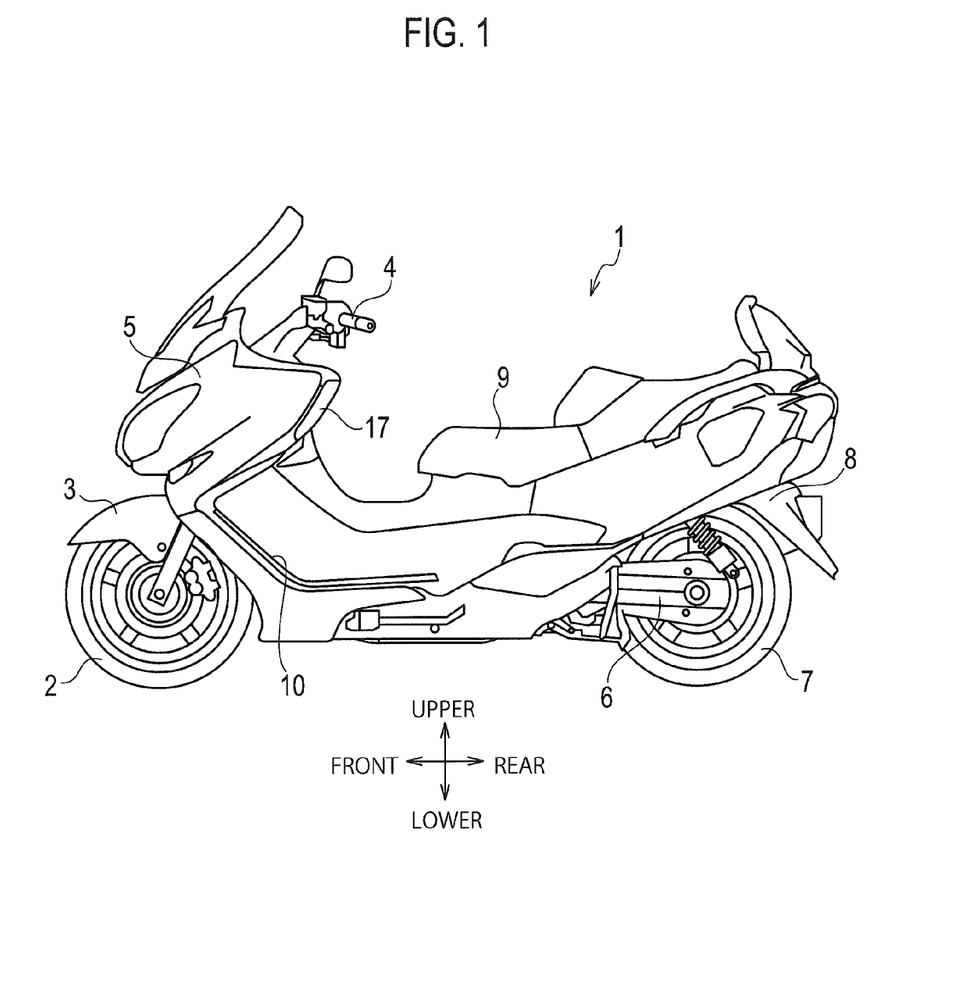
FIG. 1 is an explanatory diagram showing a saddle-riding type vehicle with a battery storage part structure according to an embodiment of the present invention.

FIG. 1 shows a saddle-riding type vehicle with a battery storage part structure according to an embodiment of the present invention. It is noted that in the description below, the directions of front, rear, left, right, upward, and downward concerning the saddle-riding type vehicle and the battery storage part structure are based on a driver sitting down on a seat of the saddle-riding type vehicle.

A saddle-riding type vehicle 1 shown in FIG. 1 is a motorcycle, specifically, a scooter. A front wheel 2 and a front fender 3 is provided at a front lower side of the saddle-riding type vehicle 1, and a handle 4 is provided at a front upper side. A front cowl 5 is provided between the front wheel 2 and the handle 4. The front cowl 5 expands up, down, left, and right and is bent so as to protrude in front, and hence, widely covering the right side, front side, and left side of the front part of the saddle-riding type vehicle 1. Further, a pair of front boxes 15 and 16 (see FIG. 2) is provided inside the front cowl 5, and each of the front boxes 15 and 16 is provided with a lid part 17.

Further, a unit swing 6 integrating an engine and a transmission is provided at a rear lower side of the saddle-riding type vehicle 1. Further, a rear wheel 7 is supported by a rear part of the unit swing 6, and a rear fender 8 is provided above the rear wheel 7. Further, a seat 9 is provided at an upper side of an intermediate part in a front-rear direction of the saddle-riding type vehicle 1, and a floor step 10 is provided between the seat 9 and the front wheel 2.

Figure 2:
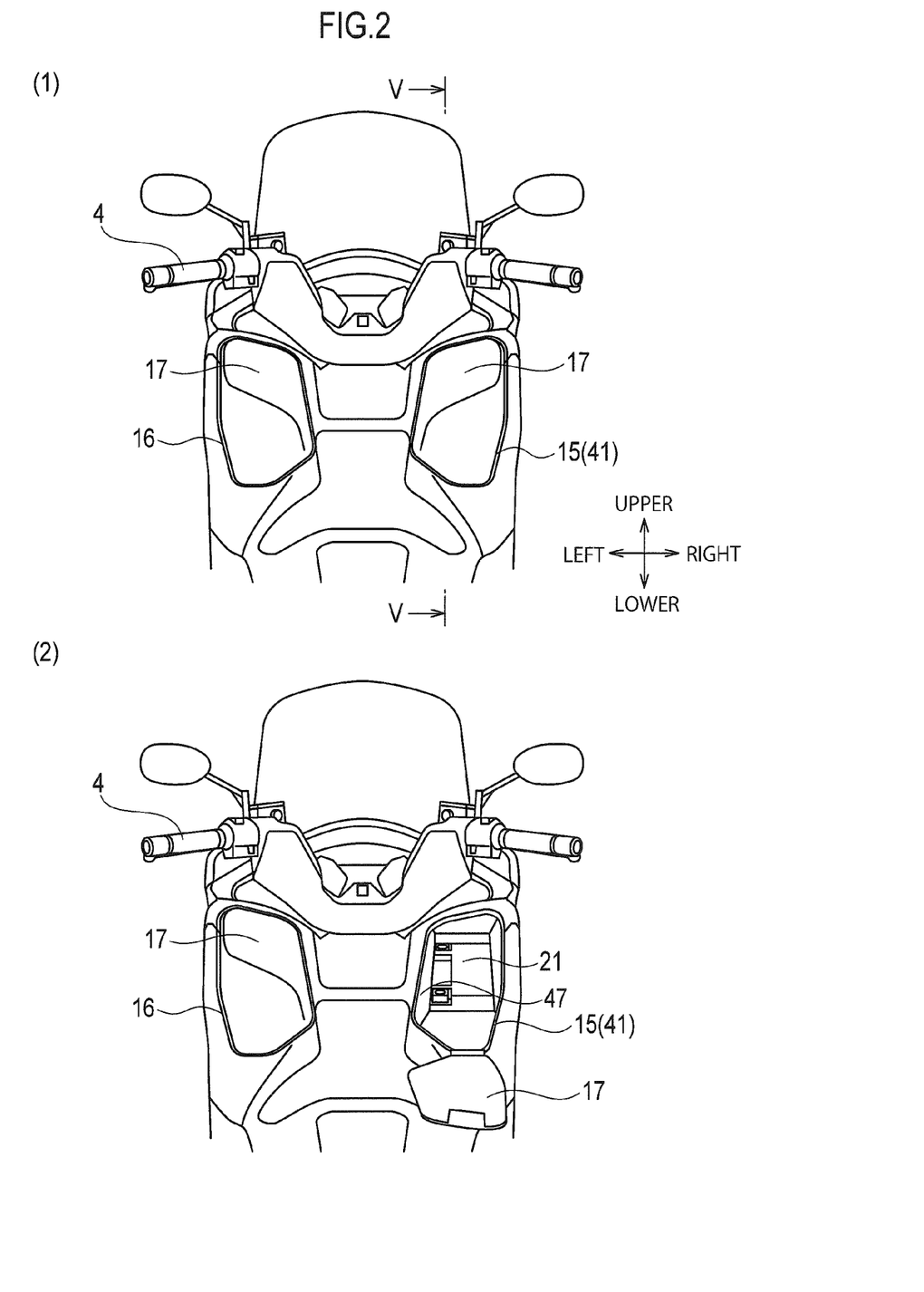

FIG. 2 is a diagram of the front upper side of the saddle-riding type vehicle 1 viewed from behind, showing the front boxes 15 and 16 and their peripheral portions. In FIG. 2, (1) of the upper side shows a state that each of the lid parts 17 of the front boxes 15 and 16 is closed, and (2) of the lower side shows a state that the lid part 17 of the right front box 15 is opened.

As shown in FIG. 2, in the present embodiment, a pair of right and left front boxes 15 and 16 is provided inside the front cowl 5. The front boxes 15 and 16 are cases for storing an article. There are various namings for the front boxes 15 and 16, such as a dashboard, a console box, a front compartment, and a glove box. Space for storing an article is formed inside each of the front boxes 15 and 16. Further, each of the front boxes 15 and 16 opens backward. Further, the openable/closable lid part 17 is attached to each of the front boxes 15 and 16. Of the pair of right and left front boxes 15 and 16, the right front box 15 corresponds to a battery storage part structure 41 according to the embodiment of the present invention. The battery storage part structure 41 is a structural body for storing a battery 21.

Figure 3:
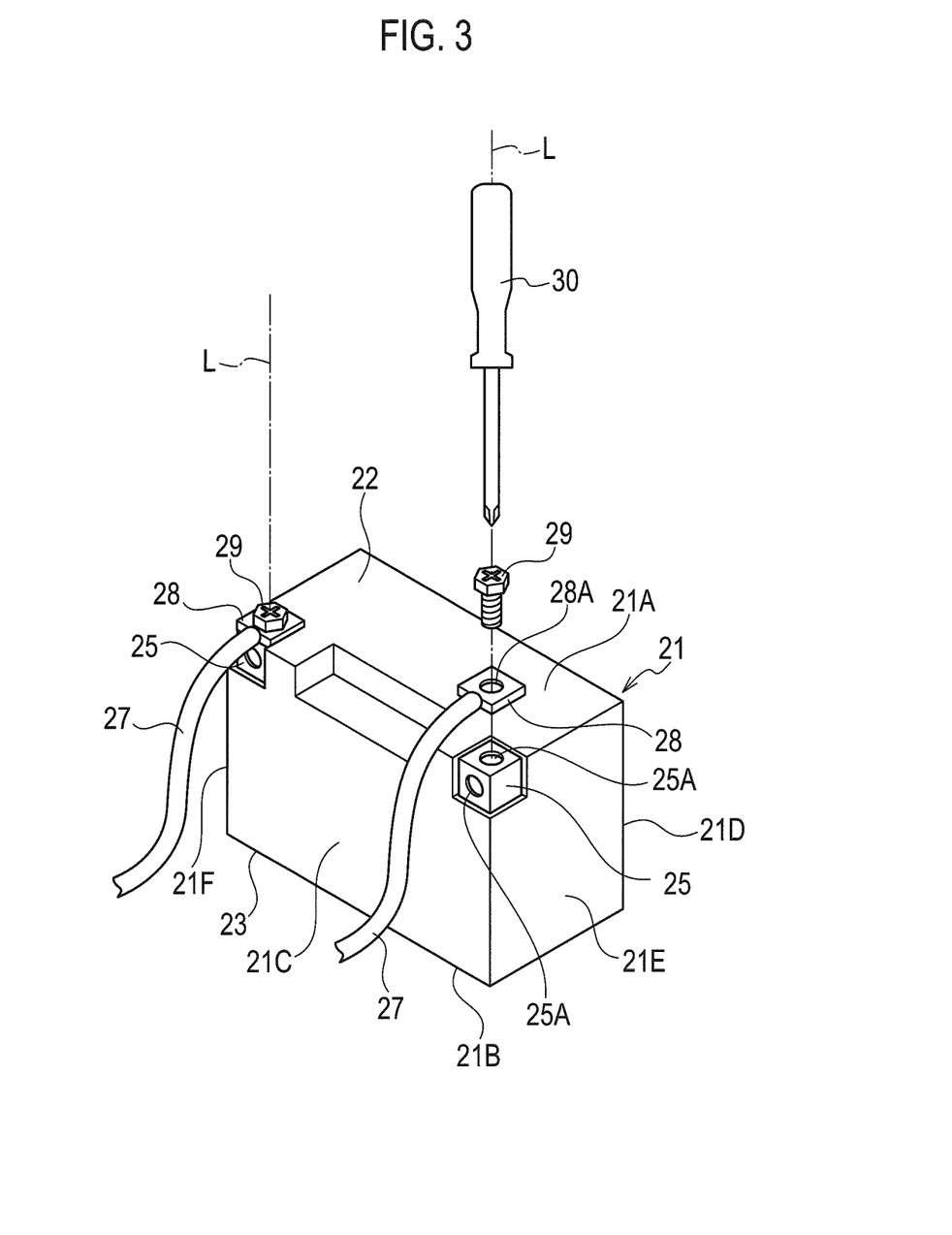
FIG. 3 is an explanatory diagram showing a battery for the saddle-riding type vehicle.

FIG. 3 shows the battery 21. It is noted that the directions of front, rear, left, right, upward, and downward concerning a structure of the battery 21 are defined separately from the directions of front, rear, left, right, upward, and downward concerning the saddle-riding type vehicle and the battery storage part structure. The battery 21 is a power source that supplies power for operating the saddle-riding type vehicle 1, and in the present embodiment, the battery 21 is a sealed type battery. The battery 21 is formed in a rectangular parallelepiped shape having an upper face 21A, a lower face 21B, a front face 21C, a rear face 21D, a right face 21E, and a left face 21F. In the battery 21, a battery terminal 25 is respectively provided to a corner part where the upper face 21A, the front face 21C, and the right face 21E are connected together, and a corner part where the upper face 21A, the front face 21C, and the left face 21F are connected together. Each of the battery terminals 25 is connected with a cable terminal 28 that is provided at an end part of a power source cable 27. Specifically, the cable terminal 28 is connected to the battery terminal 25, by inserting a bolt 29 through a through hole 28A formed in the cable terminal 28, and then fastening the bolt 29 to a bolt hole 25A formed in the battery terminal 25 by using a tool 30 such as a screwdriver. The bolt hole 25A is formed in the battery terminal 25 such that an axis of the bolt hole 25A is in a vertical direction to the upper face 21A (terminal arrangement surface 22), and thus it is possible to fix the cable terminal 28 to the battery terminal 25 by screwing the bolt 29 to the upper face 21A from the vertical direction.

There are two patterns of installation for the battery 21: vertical installation and horizontal installation. With vertical installation, the upper face 21A is directed upward and the lower face 21B is in contact with a floor. In this case, the upper face 21A is the terminal arrangement surface 22, and the lower face 21B is an installation surface 23. On the other hand, with horizontal installation, the front face 21C is directed upward, and the rear face 21D is in contact with the floor. In this case, the front face 21C is the terminal arrangement surface 22, and the rear face 21D is the installation surface 23. That is, for the battery 21 in a mounted state on a vehicle, a face located on the upper side is the terminal arrangement surface 22, and a face located on the lower side is the installation surface 23. It is noted that in the present embodiment, the battery 21 is used in vertical installation, and therefore the upper face 21A is the terminal arrangement surface 22, and the lower face 21B is the installation surface 23.

Figure 4:
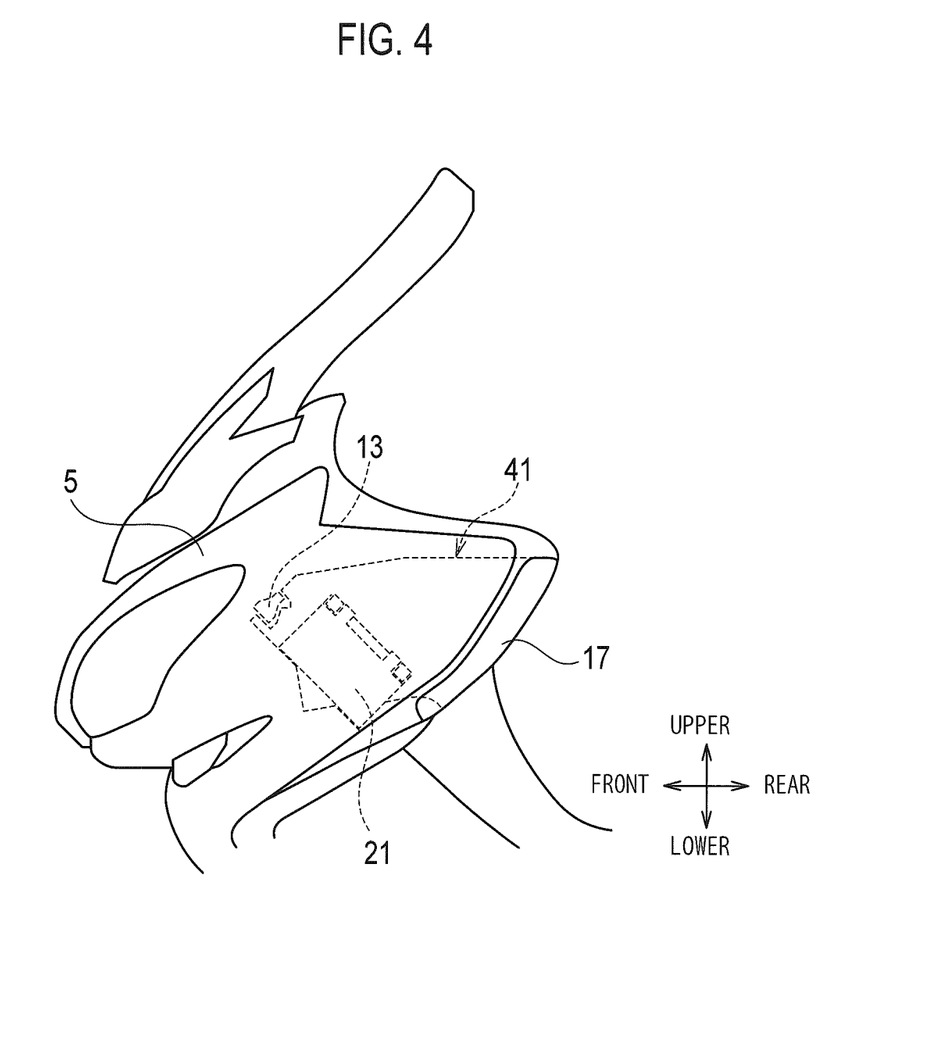
FIG. 4 is an explanatory diagram of the front upper side of the saddle-riding type vehicle in FIG. 1 viewed from the left.
Figure 5:
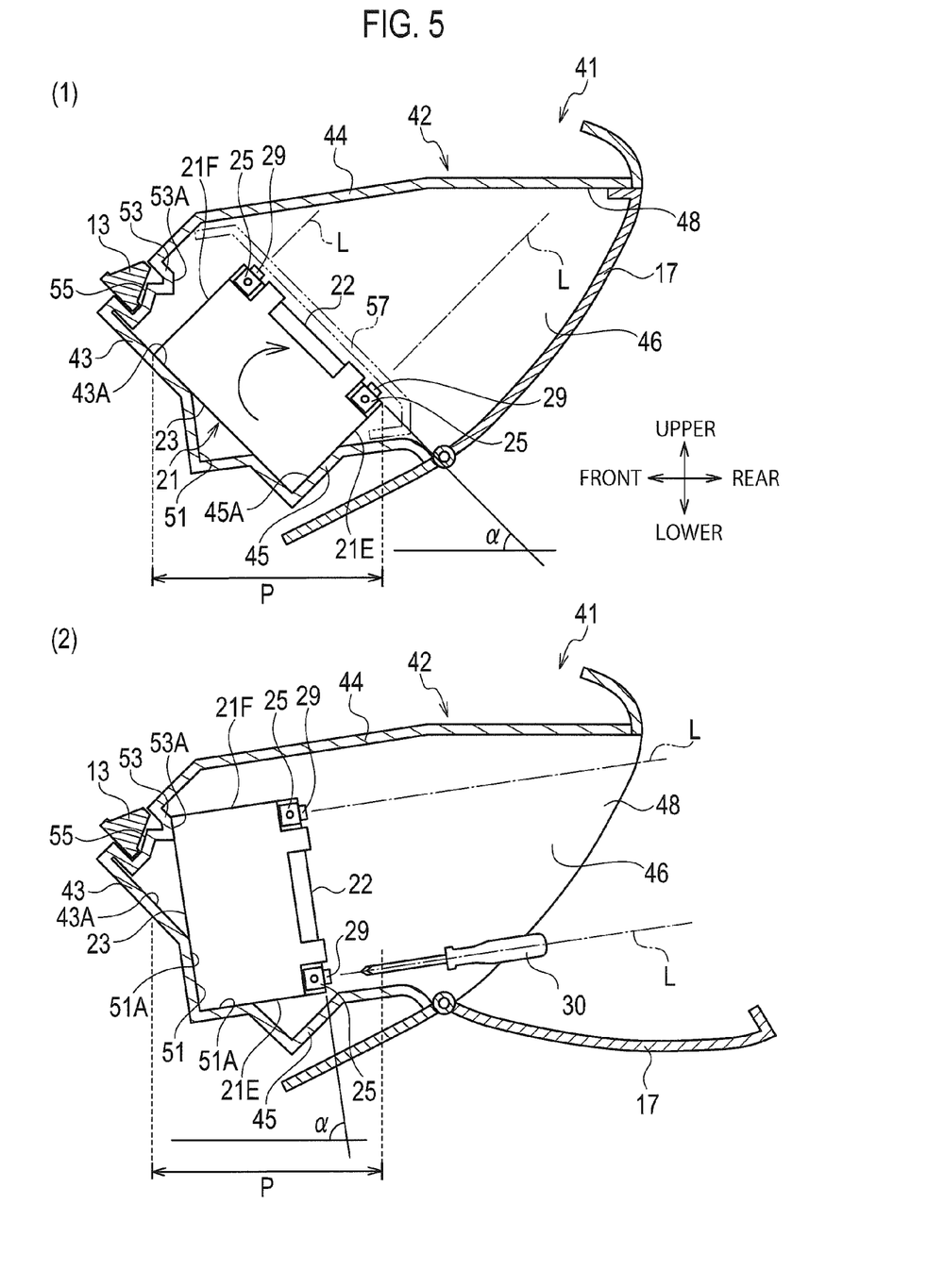

FIG. 4 shows an arrangement of the battery storage part structure 41, and FIG. 5 shows details of the battery storage part structure 41. In FIG. 5, (1) of the upper side shows a cross section viewed from an arrow mark V-V direction in FIG. 2 (1), showing a state that the battery 21 is held in the battery storage part structure 41 during normal use of the battery 21.

In FIG. 5, (2) of the lower side shows a state that the battery 21 is held in the battery storage part structure 41 during maintenance of the battery 21.

It is noted that in FIG. 4 and FIG. 5, an illustration of the power source cable 27 is omitted. FIG. 2 is also the same.

As described above, the right front box 15 arranged inside the front cowl 5 corresponds to the battery storage part structure 41. That is, as shown in FIG. 4, the battery storage part structure 41 is located at the front upper side of the saddle-riding type vehicle 1 and between the front wheel 2 and the handle 4. Further, the battery storage part structure 41 is located in front of the seat 9.

As shown in FIG. 5 (1), the battery storage part structure 41 includes a battery storage part 42 configured to store the battery 21. The battery storage part 42 includes a bottom plate part 43, an upper wall part 44, a lower wall part 45, a right wall part 46, a left wall part 47 (see FIG. 2 (2)), and an opening 48, and is formed in a bottomed cylindrical shape as a whole.

Further, the battery storage part 42 is arranged so as to elongate within the inside of the front cowl 5 in the front-rear direction and such that space inside thereof forms a horizontal hole opening backward. That is, the battery storage part 42 is arranged such that the opening 48 is located in front of the seat 9 of the saddle-riding type vehicle 1, the bottom plate part 43 is located at the front side of the saddle-riding type vehicle 1 relative to the opening 48, and the upper wall part 44, the lower wall part 45, the right wall part 46, and the left wall part 47 elongate in the front-rear direction of the saddle-riding type vehicle 1. Further, the lid part 17 of the right front box 15 functions as a lid for opening/closing the opening 48 of the battery storage part 42. The lid part 17 is pivotably supported via a hinge axes extending in a right-and-left direction of the vehicle that is arranged at a lower edge part of the opening 48 of the front box 15, and is removably attached to an engagement member provided at an upper edge part of the opening 48.

Further, in a deep part of the battery storage part 42, a holding position P for holding the battery 21 within the battery storage part 42, is set. The holding position P is located below the handle 4, and at a side of a head pipe configured to pivotably support the handle 4, a front fork, and the front wheel 2 to a body frame.

Further, the battery storage part structure 41 includes a first loading part and a second loading part. The first loading part and the second loading part are provided in the battery storage part 42.

The first loading part has a function of loading the battery 21 at the holding position P in a first posture, and is configured by a surface 43A of the bottom plate part 43, and a portion near the bottom plate part 43 on a surface 45A of the lower wall part 45.

The first posture of the battery 21 is a posture shown in FIG. 5 (1). That is, the first posture of the battery 21 is a posture that the terminal arrangement surface 22 is directed to the upper side or the rear upper side of the saddle-riding type vehicle 1, and an inclination angle α relative to a horizontal plane of the terminal arrangement surface 22 is a predetermined angle of 0 degree or more and 45 degrees or less. In the first posture, the terminal arrangement surface 22 is directed in the direction of the upper wall part 44. Further, in the first posture according to the present embodiment, the terminal arrangement surface 22 is inclined such that a part of the rear side of the vehicle is lowered, but the inclination angle is gentler as compared with a second posture described later. Further, when the battery 21 is in the first posture, the installation surface 23 of the battery 21 is in surface contact with the surface 43A of the bottom plate part 43 of the battery storage part 42, and a portion of an end side near the installation surface 23 on the right face 21E of the battery 21 is in surface contact with a portion of an end side near the bottom plate part 43 on the surface 45A of the lower wall part 45 of the battery storage part 42. That is, the lower wall part 45 of the battery storage part 42 is inclined such that a portion of the front side of the vehicle is lowered, and the bottom plate part 43 of the battery storage part 42 is inclined such that the portion of the rear side of the vehicle is lowered. Then, when the battery 21 is in the first posture, the installation surface 23 of the battery 21 is in surface contact with the surface 43A of the bottom plate part 43, and a lower right corner part where the right face 21E and the installation surface 23 (lower face 21B) are connected together in the battery 21 enters into a corner part where the lower wall part 45 and the bottom plate part 43 are connected together in the battery storage part 42.

It is noted that when the battery 21 is held in the first posture at the holding position P within the battery storage part 42, a holding member and a battery cover 57 may be arranged at the upper side of the battery 21 within the battery storage part 42, and then the battery 21 may be fixed to the holding position P in the first posture by using the holding member and the battery cover 57. Further, by attaching the battery cover 57 so as to cover over the battery 21, the space from the battery cover 57 to the opening 48 may be used as, for example, the space for storing an articles such as a glove.

On the other hand, the second loading part has a function of loading the battery 21 at the holding position P in the second posture, and is configured by a groove 51 and a protruding part 53. The groove 51 is formed at the bottom plate part 43. Specifically, the groove 51 is arranged at the front side of the vehicle relative to a corner part where the lower wall part 45 and the bottom plate part 43 are connected together, the corner part is engaged with the lower right corner part of the battery 21 in the first posture. Further, the groove 51 is formed by denting an almost intermediate portion of the surface 43A of the bottom plate part 43. It is noted that the groove 51 may be configured by a hole to which the lower right corner part of the battery 21 engages. However, in this case, there is a need to take into consideration intrusion of dust to the space within the battery storage part 42. The protruding part 53 is formed at the upper wall part 44. Specifically, the protruding part 53 is formed by protruding a portion near the bottom plate part 43 on the upper wall part 44 into the battery storage part 42. It is noted that the protruding part 53 may be a structure configured to abut on the installation surface 23 of the battery 21 to support the battery 21, and may be formed so as to protrude from the bottom plate part 43 into the battery storage part 42.

The second posture of the battery 21 is a posture shown in FIG. 5 (2). That is, the second posture of the battery 21 is a posture that the terminal arrangement surface 22 is directed to the rear upper side or the rear side of the saddle-riding type vehicle 1, and the inclination angle α relative to the horizontal plane of the terminal arrangement surface 22 is a predetermined angle of 45 degrees or more and 90 degrees or less. In the second posture, the terminal arrangement surface 22 is directed in the direction of the opening 48. That is, with respect to the first posture, the second posture is in a posture that the battery 21 is rotated about an axis in the right-and-left direction of the vehicle. When the battery 21 is in the second posture, the lower right corner part and its peripheral portion of the battery 21, that is, a portion of an end side near the right face 21E on the installation surface 23 of the battery 21 and a portion of an end side near the installation surface 23 of the battery 21 on the right face 21E of the battery 21 enter into the groove 51. At this time, the portion of the end side near the right face 21E on the installation surface 23 of the battery 21 and the portion of the end side near the installation surface 23 of the battery 21 on the right face 21E of the battery 21 are in surface contact with an inner surface 51A of the groove 51. Further, when the battery 21 is in the second posture, a portion of an end side near the left face 21F on the installation surface 23 of the battery 21 is in contact with a protruding end 53A of the protruding part 53. That is, the lower right corner part of the battery 21 enters, when in the first posture, into the corner part where the lower wall part 45 and the bottom plate part 43 are connected together, but enters into the groove 51 when in the second posture, and the installation surface 23 of the battery 21 being in surface contact with the surface 43A of the bottom plate part 43 when in the first posture, is in contact with the protruding end 53A of the protruding part 53.

During normal use of the battery 21 (for example, during travelling in the saddle-riding type vehicle 1), as shown in FIG. 5 (1), the battery 21 is held in the first posture at the holding position P within the battery storage part 42. In the first posture, the inclination angle α of the battery 21 is almost horizontal and gentler, and a contact area of the installation surface 23 of the battery 21 and the surface 43A of the bottom plate part 43 is larger, as compared to the second posture, and thus, it is possible to hold the battery 21 in a stable state. However, in the first posture, the terminal arrangement surface 22 of the battery 21 is directed in the direction of the upper wall part 44 of the battery storage part 42, and therefore, the upper wall part 44 interrupts a tool line L that is a working space of the tool 30 such as a screwdriver (arrangement place of tools) for rotating the bolt 29 that fixes the cable terminal 28 to the battery terminal 25. As a result, it is not possible to secure the tool line L required for the maintenance work, and thus, it is not possible to engage the tool 30 with the bolt 29, making it difficult to perform the maintenance work of the battery 21. For example, when the battery 21 is still in the first posture at the time of detaching the power source cable 27 from the battery 21, it is difficult to use the tool 30 to loosen the bolt 29 fixing the cable terminal 28 to the battery terminal 25.

On the other hand, during the maintenance of the battery 21 (when detaching the battery 21 from the saddle-riding type vehicle 1 or when attaching the battery 21 to the saddle-riding type vehicle 1), as shown in FIG. 5 (2), the battery 21 is held in the second posture at the holding position P within the battery storage part 42. In the second posture, the terminal arrangement surface 22 of the battery 21 is directed in the direction of the opening 48 of the battery storage part 42, and therefore, the tool line L (an axis line of the bolt hole 25A or an axis line of the bolt 29) elongates between the inside and the outside of the battery storage part 42 through the opening 48. Therefore, it is possible to secure the tool line L required for the maintenance work. Consequently, it becomes possible to easily perform the maintenance work of the battery 21. For example, when detaching the power source cable 27 from the battery 21, it is possible to detach the battery 21 by inserting the tool 30 such as a screwdriver from the opening 48 into the inside of the battery storage part 42, connecting the tool 30 with the bolt 29 fixing the cable terminal 28 to the battery terminal 25, and turning the tool 30 to loosen the bolt 29. Similarly, also when attaching the power source cable 27 to the battery 21, it is possible to use the tool 30 to fasten the bolt 29, and to fix the cable terminal 28 to the battery terminal 25. At this time, the battery 21 is supported by abutting on the inner surface 51A of the groove 51 directed in the direction of the opening 48 of the battery storage part 42 and the protruding end 53A directed in the direction of the opening 48, and thus, it is possible to resist force applied to the battery 21 due to the work. For this reason, there is no need to perform attachment/detachment work of the power source cable 27 with supporting the battery 21 by hand, and thus, it is possible to facilitate the work performed inside the battery storage part 42.

It is noted that when changing the posture of the battery 21, at the holding position P within the battery storage part 42, from the first posture to the second posture or from the second posture to the first posture, an operator puts his/her hands into the battery storage part 42 from the opening 48 and moves the battery 21 by hand.

On the other hand, as shown in FIG. 5 (1), at the back side of the protruding part 53 formed on the upper wall part 44 of the battery storage part 42, a recess 55 corresponding to a shape of the protruding part 53 protruding into the battery storage part 42 is formed, and an engine control unit (ECU) 13 of the saddle-riding type vehicle 1 is arranged within the recess 55. As described above, by putting a part of the engine control unit 13 into the recess 55, it is possible to arrange the engine control unit 13 in a stable state of not easily being displaced, and also it is possible to downsize the saddle-riding type vehicle 1 by improving the space utilization efficiency.

As described above, in accordance with the battery storage part structure 41 according to the embodiment of the present invention, the battery 21 is held in the first posture during normal use of the battery 21 and the battery 21 is held in the second posture during maintenance of the battery 21, and thus, during normal use, it is possible to hold the battery 21 in a stable state, and during the maintenance work, it is possible to facilitate securing the tool line to improve the workability of the maintenance.

Further, with the battery storage part structure 41, the battery 21 is stopped at the holding position P within the battery storage part 42 when the battery 21 is in the first posture or in the second posture. As described above, it is possible to produce a state capable of easily securing the tool line to the battery 21 by changing the inclination angle α of the battery 21 with the battery 21 stopped at the holding position P, and thus, the length of the power source cable 27 may a length long enough to allow such an inclination action (rotating action) of the battery 21, and consequently, it is possible to shorten the power source cable 27. That is, unlike the above-described battery storage part structure described in Patent Document 1, there is no need to move the battery from the deep part of the storage part to a proximity of the opening (temporarily storing part) in order to produce a state capable of easily securing the tool line to the battery, and thus, there is no need to longer the power source cable by taking into consideration the moving distance of the battery. Consequently, when the battery 21 is put into the battery storage part 42, it is possible to prevent the power source cable 27 from being an obstacle and then make it easier to put the battery 21 into the battery storage part 42.

Further, according to the battery storage part structure 41, the battery 21 is held in the first posture by making the battery 21 being in contact with the surface 43A of the bottom plate part 43 and the surface 45A of the lower wall part 45 of the battery storage part 42, and the battery 21 is held in the second posture by making the battery 21 being in contact with the groove 51 and the protruding part 53 of the battery storage part 42, and thus, it is possible to actualize, with a simple structure, a function of holding the battery 21 in such two patterns of postures.

Further, according to the battery storage part structure 41, it is possible to hold in a stable state the battery 21 in the second posture that facilitates the maintenance work. That is, the battery storage part structure described in the Patent Document 1 has a structure configured to support a battery by hooking one of the corners of the battery on a temporarily storing part of the battery during maintenance (a structure configured to support the battery by a straight-line contact), and therefore, there is a need to support the battery by hand to prevent the battery from being inclined at the place. For this reason, the operator needs to perform the work of attaching/detaching a power source cable to/from the battery with supporting the battery by hand, and practically, there is a problem that it is not easy to perform the maintenance work. For example, it is not easy to attach/detach a bolt fixing a terminal in one hand, with the other hand supporting the battery. On the other hand, in accordance with the battery storage part structure 41 according to the embodiment of the present invention, two portions of the battery 21 in the second posture, that is, both sides of the installation surface 23 are supported by the groove 51 and the protruding part 53 respectively, and moreover, at this time, the battery 21 is supported in a state of being in surface contact with the inner surface 51A of the groove 51, and thus, it is possible to support the battery 21 in the second posture in a stable state. Consequently, it is possible to perform the attachment/detachment work of the power source cable 27 to/from the battery 21, without supporting the battery 21 by hand. Even in this regard, in accordance with the battery storage part structure 41 according to the embodiment of the present invention, it is possible to improve the workability of maintenance of the battery 21.

It is noted that in the above-described embodiment, a case is described in which the battery 21 is used in vertical installation; however, the battery 21 may be used in horizontal installation. Further, a case is described in which the battery storage part structure 41 is provided inside the front cowl 5; however, the battery storage part structure 41 may be provided to another place in the saddle-riding type vehicle 1 such as under the seat 9. Further, a case is described in which the battery storage part structure 41 is provided such that space inside thereof forms a horizontal hole; however the battery storage part structure 41 may be provided such that space inside thereof forms a vertical hole. Further, a case is described in which the engine control unit 13 is arranged within the recess 55 formed at the back side of the protruding part 53 on the upper wall part 44 of the battery storage part 42; however, the engine control unit 13 may be arranged at another place. Further, it is possible to apply the battery storage part structure of the present invention not only to a scooter but also to another type of the saddle-riding type vehicle.

Further, the present invention may be appropriately modified within the range not contrary to the gist or idea of the present invention understandable from claims and the entire specification, and a battery storage part structure with such a modification is also included in the technological idea of the present invention.

REFERENCE SIGNS LIST 1 saddle-riding type vehicle
5 front cowl
13 engine control unit
15, 16 front boxes
21 battery
22 terminal arrangement surface
23 installation surface
25 battery terminal
25A bolt hole
27 power source cable
28 cable terminal
28A through hole
29 bolt
30 tool
41 battery storage part structure
42 battery storage part
43 bottom plate part
43A surface
44 upper wall part
45 lower wall part
45A surface
46 right wall part
47 left wall part
48 opening
51 groove
51A inner surface
53 protruding part
53A protruding end
55 recess
P holding position
α inclination angle
L tool line

What is claimed is:

1. A battery storage part structure of a saddle-riding vehicle configured to store a battery of which one face is a terminal arrangement surface arranged with a battery terminal connecting a power source cable and the opposite face of the terminal arrangement surface is an installation surface, comprising:
  a battery storage part configured to hold the battery at a predetermined holding position inside the battery storage part, the battery storage part having a bottom plate part, a peripheral wall part, and an opening arranged at an opposite side of the bottom plate part;
  a first loading part configured to load the battery at the holding position in a first posture with the terminal arrangement surface directed in a direction of the peripheral wall part, the first loading part being provided in the battery storage part; and
  a second loading part configured to load the battery at the holding position in a second posture with the terminal arrangement surface directed in a direction of the opening, the second loading part being provided in the battery storage part, wherein
  the first loading part includes a surface of the bottom plate part with which the installation surface of the battery in the first posture is in contact, and
  the second loading part includes a groove provided to the bottom plate part and into which a portion of one end side of the installation surface of the battery in the second posture enters.

2. The battery storage part structure according to claim 1, wherein
  the second loading part includes a protruding part that protrudes into the battery storage part from the peripheral wall part, the protruding part having a protruding end being in contact with a portion of another end side of the installation surface of the battery in the second posture.

3. The battery storage part structure according to claim 2, wherein at a back side of the protruding part, a recess corresponding to a shape of the protruding part protruding into the battery storage part is formed, and an engine control unit of the saddle-riding vehicle is arranged within the recess.

4. A battery storage part structure of a saddle-riding vehicle configured to store a battery of which one face is a terminal arrangement surface arranged with a battery terminal connecting a power source cable and the opposite face of the terminal arrangement surface is an installation surface, comprising:
   a battery storage part configured to hold the battery at a predetermined holding position inside the battery storage part, the battery storage part having a bottom plate part, a peripheral wall part, and an opening arranged at an opposite side of the bottom plate part;
   a first loading part configured to load the battery at the holding position in a first posture with the terminal arrangement surface directed in a direction of the peripheral wall part, the first loading part being provided in the battery storage part; and
   a second loading part configured to load the battery at the holding position in a second posture with the terminal arrangement surface directed in a direction of the opening, the second loading part being provided in the battery storage part, wherein
   the battery storage part is provided inside a front cowl of the saddle-riding vehicle,
   for the battery storage part, the opening is located in front of a seat of the saddle-riding vehicle, the bottom plate part is located at a front side in the saddle-riding vehicle relative to the opening, and the peripheral wall part is arranged so as to elongate in a front-rear direction of the saddle-riding vehicle,
   when the battery is loaded on the first loading part, the terminal arrangement surface is directed to an upper side or a rear upper side of the saddle-riding vehicle, and an inclination angle relative to a horizontal plane of the terminal arrangement surface is 0 degree or more and 45 degrees or less, and
   when the battery is loaded on the second loading part, the terminal arrangement surface is directed to the rear upper side or a rear side of the saddle-riding vehicle, and the inclination angle relative to the horizontal plane of the terminal arrangement surface is 45 degrees or more and 90 degrees or less.

* * * * *